(12) United States Patent
Shinoda et al.

(10) Patent No.: US 12,551,190 B2
(45) Date of Patent: Feb. 17, 2026

(54) ULTRASONIC PROBE

(71) Applicant: Canon Medical Systems Corporation, Otawara (JP)

(72) Inventors: Kohei Shinoda, Nasushiobara (JP); Tomohiro Sato, Otawara (JP); Kentaro Tsuzuki, Nasushiobara (JP); Kengo Okada, Nasushiobara (JP); Hana Sonoda, Utsunomiya (JP)

(73) Assignee: Canon Medical Systems Corporation, Otawara (JP)

( * ) Notice: Subject to any disclaimer, the term of this patent is extended or adjusted under 35 U.S.C. 154(b) by 0 days.

(21) Appl. No.: 18/945,460

(22) Filed: Nov. 12, 2024

(65) Prior Publication Data
US 2025/0160792 A1  May 22, 2025

(30) Foreign Application Priority Data
Nov. 21, 2023 (JP) .................. 2023-197629

(51) Int. Cl.
*A61B 8/00* (2006.01)

(52) U.S. Cl.
CPC .................. *A61B 8/4494* (2013.01)

(58) Field of Classification Search
CPC ... A61B 8/4494; A61B 8/4455; A61B 8/4444; B06B 1/067; G01N 29/221; G10K 11/02; G10K 11/30
See application file for complete search history.

(56) References Cited

U.S. PATENT DOCUMENTS

| | | | | |
|---|---|---|---|---|
| 3,618,696 A | * | 11/1971 | Hurwitz | G10K 11/30 367/902 |
| 4,001,766 A | * | 1/1977 | Hurwitz | G10K 11/30 359/651 |
| 5,365,024 A | * | 11/1994 | Hasegawa | G10K 11/30 367/150 |
| 2002/0007118 A1 | * | 1/2002 | Adachi | G01S 15/8922 600/443 |

(Continued)

FOREIGN PATENT DOCUMENTS

| | | | | |
|---|---|---|---|---|
| GB | 2091520 A | * | 7/1982 | ......... G01S 15/8918 |
| JP | 2000-189417 A | | 7/2000 | |

(Continued)

*Primary Examiner* — Adil S Virk
(74) *Attorney, Agent, or Firm* — Oblon, McClelland, Maier & Neustadt, L.L.P.

(57) ABSTRACT

According to one embodiment, an ultrasonic probe includes a transducer group and an acoustic lens. The transducer group include a plurality of ultrasonic transducers. The acoustic lens is provided on a transmitting/receiving side of the transducer group and includes a first curved surface and a second curved surface corresponding to an acoustically effective aperture of at least the transducer group. The acoustic lens is higher in sound speed than a first medium in contact with the first curved surface and higher in sound speed than a second medium in contact with the second curved surface or a soft tissue in contact with the second curved surface. The first curved surface is a concave surface and facing the transmitting/receiving side. The second curved surface is a concave surface and opposing the first curved surface. The first curved surface is different in radius of curvature from the second curved surface.

15 Claims, 8 Drawing Sheets

(56) References Cited

U.S. PATENT DOCUMENTS

| | | | |
|---|---|---|---|
| 2002/0042572 A1* | 4/2002 | Fukukita | B06B 1/064 600/443 |
| 2006/0144871 A1* | 7/2006 | Van Tuyl | G01N 29/032 73/32 A |
| 2008/0156577 A1* | 7/2008 | Dietz | G10K 11/30 181/176 |
| 2009/0048521 A1* | 2/2009 | Hasegawa | G01N 29/221 600/459 |
| 2010/0162817 A1* | 7/2010 | Hara | G01N 29/12 73/587 |
| 2013/0060141 A1* | 3/2013 | Sinelnikov | A61B 8/4209 600/439 |
| 2013/0150725 A1* | 6/2013 | Choi | A61B 8/4494 600/472 |
| 2017/0000459 A1* | 1/2017 | Shikata | A61B 8/4281 |
| 2018/0192990 A1* | 7/2018 | Tanter | B29D 11/00 |
| 2021/0330292 A1* | 10/2021 | Song | A61B 8/4427 |
| 2024/0013766 A1* | 1/2024 | Mori | A61B 8/00 |

FOREIGN PATENT DOCUMENTS

| | | |
|---|---|---|
| JP | 2005-5923 A | 1/2005 |
| JP | 2022-85042 A | 6/2022 |

* cited by examiner

ULTRASONIC PROBE

CROSS-REFERENCE TO RELATED APPLICATION

This application is based upon and claims the benefit of priority from Japanese Patent Application No. 2023-197629, filed Nov. 21, 2023, the entire contents of which are incorporated herein by reference.

FIELD

Embodiments described herein relate generally to an ultrasonic probe.

BACKGROUND

Generally, an ultrasonic probe includes an acoustic lens configured to converge ultrasonic beams in a slice direction. Such an acoustic lens is configured to converge ultrasonic beams using bending due to a difference in sound speed from a medium (for example, a body surface) with which the acoustic lens comes in contact. A focal distance of the acoustic lens is based on, for example, a radius of curvature in a curved surface serving as a boundary between the acoustic lens and the medium (that is, the radius of curvature in the curved surface of the acoustic lens).

Furthermore, when ultrasonic beams propagate through an interface with a different acoustic impedance, some of the ultrasonic beams are reflected and the rest is transmitted. At this time, a reflectance of an ultrasonic beam increases as an angle of incidence of the ultrasonic beam with respect to a boundary with a different acoustic impedance becomes larger.

Ultrasonic probes include a high-frequency probe for the purpose of depicting tissue (superficial tissue) in a part of the body close to the surface. A high-frequency probe may use a plano-concave lens as an acoustic lens. Such a plano-concave lens is a lens in which one surface is flat and the other surface is concave.

For the purpose of depicting superficial tissue, a high-frequency probe that uses a plano-concave lens as an acoustic lens needs to have a short focal distance, so that the radius of curvature of the concave surface needs to be small. However, if the radius of curvature of the concave surface is made smaller, the angle of incidence of an ultrasonic beam increases, thereby increasing the reflectance of the ultrasonic beam. If an ultrasonic beam has a high reflectance, a radiation efficiency of the ultrasonic beam that is incident on the body surface decreases, and the influence of artifacts due to multiple reflections of the ultrasonic beam within the acoustic lens increases. Therefore, in the ultrasonic probe, a decrease in the reflectance of the ultrasonic beam on the surface of the acoustic lens may become a factor that deteriorates a quality of an ultrasonic image.

DETAILED DESCRIPTION

In general, according to one embodiment, an ultrasonic probe includes a transducer group and an acoustic lens. The transducer group include a plurality of ultrasonic transducers. The acoustic lens is provided on a transmitting/receiving side of the transducer group and includes a first curved surface and a second curved surface corresponding to an acoustically effective aperture of at least the transducer group. The acoustic lens is higher in sound speed than a first medium in contact with the first curved surface and higher in sound speed than a second medium in contact with the second curved surface or a soft tissue in contact with the second curved surface. The first curved surface is a concave surface and facing the transmitting/receiving side. The second curved surface is a concave surface and opposing the first curved surface. The first curved surface is different in radius of curvature from the second curved surface.

Hereinafter, embodiments of an ultrasonic probe will be described in detail with reference to the accompanying drawings.

First Embodiment

Figure 1:
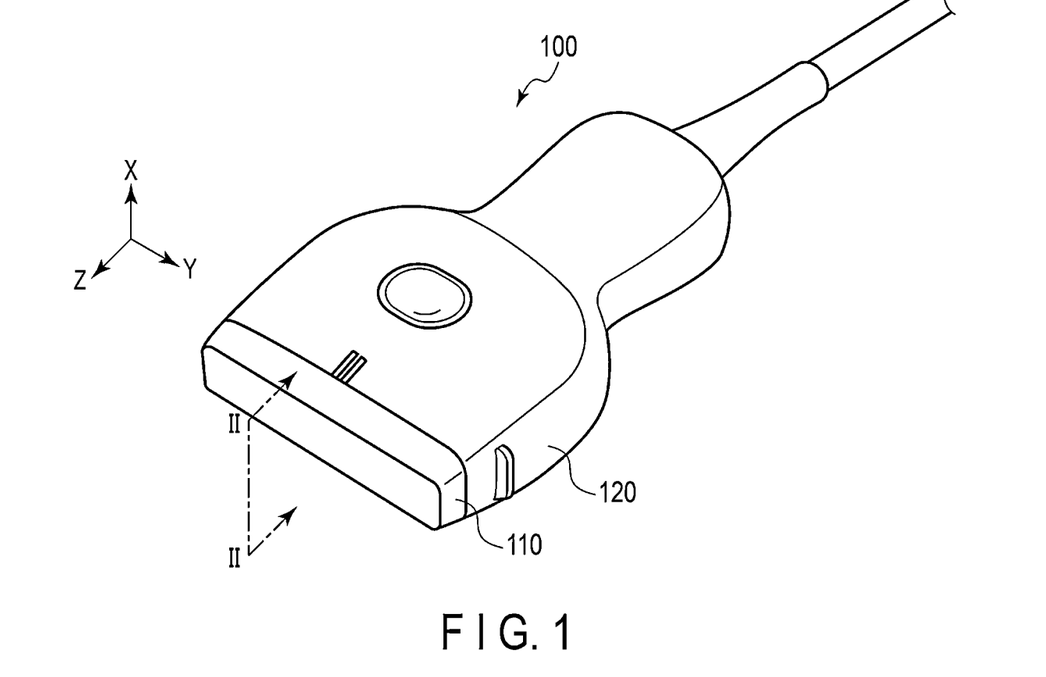
FIG. 1 is a diagram illustrating an example of an external appearance of an ultrasonic probe according to a first embodiment.

FIG. 1 is a diagram illustrating an example of an external appearance of an ultrasonic probe 100 according to a first embodiment. The ultrasonic probe 100 corresponds to, for example, a high-frequency linear probe. The ultrasonic probe 100 performs ultrasound scanning on a scan region within a living body under control of an ultrasonic diagnostic apparatus. Hereinafter, a beam of ultrasound generated by ultrasonic scanning will be referred to as an "ultrasonic beam".

The external appearance of the ultrasonic probe 100 is composed of a distal end cover 110 (which may also be simply referred to as a "cover") and a case 120. The distal end cover 110 is provided at the distal end of the ultrasonic probe 100. A concrete configuration of the ultrasonic probe 100 will be described with reference to FIG. 2.

Hereinafter, an X axis is set to a slice direction (also referred to as an elevation direction), which is a long side direction of an ultrasonic transducer (also simply referred to as a "transducer"), a Y axis is set to a scanning direction (also referred to as a "lateral direction") in which the transducer is arranged, and a Z axis is set to an acoustic radiation direction in which the ultrasonic beam is radiated.

Figure 2:
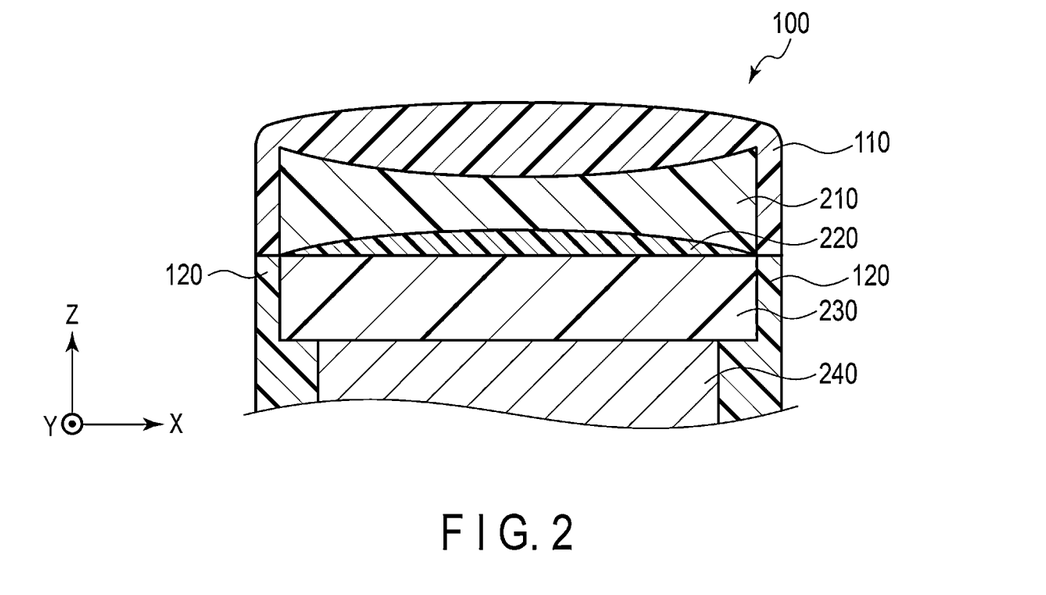
FIG. 2 is a sectional view taken along line II-II in FIG. 1.

FIG. 2 is a sectional view taken along line II-II of FIG. 1. FIG. 2 shows a portion of the cross section of the ultrasonic probe 100 in the slice direction. As shown in FIG. 2, the ultrasonic probe 100 includes the distal end cover 110 and the case 120, and further includes an acoustic lens 210, an adhesive layer 220, an acoustic matching layer 230, and a transducer group 240. FIG. 2 omits configurations subsequent to a backing material provided in the transducer group 240.

The distal end cover 110 is made of, for example, polybutadiene (also referred to as "butadiene rubber"). The sound speed of the ultrasonic beam passing through the distal end cover 110 is approximately the same as the sound speed of the ultrasonic beam passing through the soft tissue of a living body. The distal end cover 110 is formed so as to cover at least a radiation surface of the acoustic lens 210, which is the surface from which the ultrasonic beam is radiated. The distal end cover 110 is joined to the radiation surface without any gap. In the example shown in FIG. 2, the distal end cover 110 is formed so as to cover substantially the entire acoustic lens 210.

Hereinafter, "a sound speed of the ultrasonic beam passing through the distal end cover" will simply be referred to as "a sound speed of the ultrasonic beam." This also applies to other structural elements or the soft tissue of a living body. A material forming each structural element (for example, polybutadiene for the distal end cover) may be used as a single material or as a main material.

The case 120 is made of polycarbonate resin and ABS resin, for example. The case 120 accommodates each of the above components built into the ultrasonic probe 100, and is also used as a handle. In the example shown in FIG. 2, the case 120 accommodates the acoustic matching layer 230 and the transducer group 240.

The acoustic lens 210 is formed of, for example, a material containing polymethylpentene as a main component. The acoustic lens 210 has two curved surfaces such that the thickness of the central portion in the slice direction is thinner than the thickness of the peripheral portion. Each of the two curved surfaces is a concave surface. The acoustic lens 210 includes a region forming a biconcave lens. Two curved surfaces are formed on an incident surface and a radiation surface of the acoustic lens 210, respectively. The radiation surface of the acoustic lens 210 is joined to the distal end cover 110 without any gap. The incident surface of the acoustic lens 210 is jointed to the acoustic matching layer 230 with the adhesive layer 220 intervening therebetween. In the example shown FIG. 2, the acoustic lens 210 is covered with the distal end cover 110 except for the incident surface. Both the first curved surface and the second curved surface may be called a concave lens.

The adhesive layer 220 is, for example, a silicon-based adhesive. The adhesive layer 220 joins the acoustic lens 210 and acoustic matching layer 230 together.

The acoustic matching layer 230 is made of, for example, epoxy resin. The acoustic matching layer 230 is joined to the acoustic lens 210 with the adhesive layer 220 intervening therebetween. The acoustic matching layer 230 performs matching of acoustic impedances (impedance matching) between the transducer group 240 and the body surface (or a configuration provided between the acoustic matching layer 230 and the body surface). The acoustic matching layer 230 may be configured by laminating a plurality of materials having different acoustic impedances.

The transducer group 240 includes a plurality of ultrasonic transducers and is arranged in the scanning direction. The ultrasonic transducer is formed of, for example, a piezoceramic material (e.g., lead zirconate titanate) or a polymeric electronic membrane material (e.g., polyvinylidene fluoride). The transducer group 240 is joined to the acoustic lens 210 with the acoustic matching layer 230 and the adhesive layer 220 intervening therebetween. With respect to the transducer group 240, the side that transmits and receives ultrasonic beams may be referred to as a "transmitting/receiving side".

Figure 3:
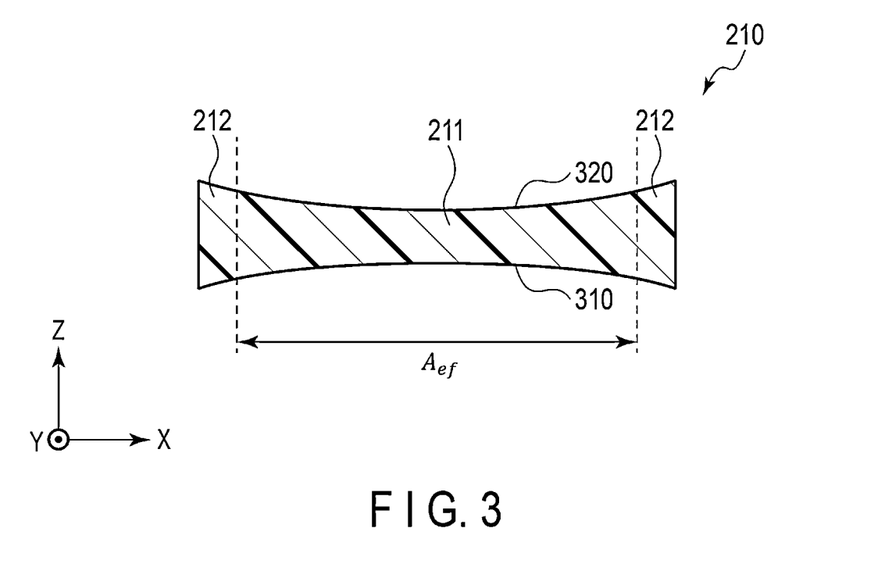
FIG. 3 is an explanatory diagram regarding an acoustic lens in FIG. 2.

FIG. 3 is an explanatory diagram regarding the acoustic lens 210 shown in FIG. 2. The acoustic lens 210 has a first region 211 corresponding to an acoustic effective aperture $A_{ef}$ and a second region 212 other than that first region 211. The acoustic effective aperture $A_{ef}$ corresponds to, for example, the length of the ultrasonic transducer in the slice direction. The first region 211 has a first curved surface 310 formed on the incident surface of the acoustic lens 210 and a second curved surface 320 formed on the radiation surface of the acoustic lens 210. The first curved surface 310 and the second curved surface 320 may be the same in curvature (the same in radius of curvature), or may be different in curvature (may be different in radius of curvature).

In other words, the acoustic lens 210 is provided on the transmitting/receiving side of the transducer group 240 and has the first curved surface 310 and the second curved surface 320 each corresponding to the acoustically effective aperture $A_{ef}$ of at least the transducer group 240. The first curved surface 310 is a concave surface and faces the transmitting/receiving side, and the second curved surface 320 is a concave surface and opposes the first curved surface 310.

Figure 4:
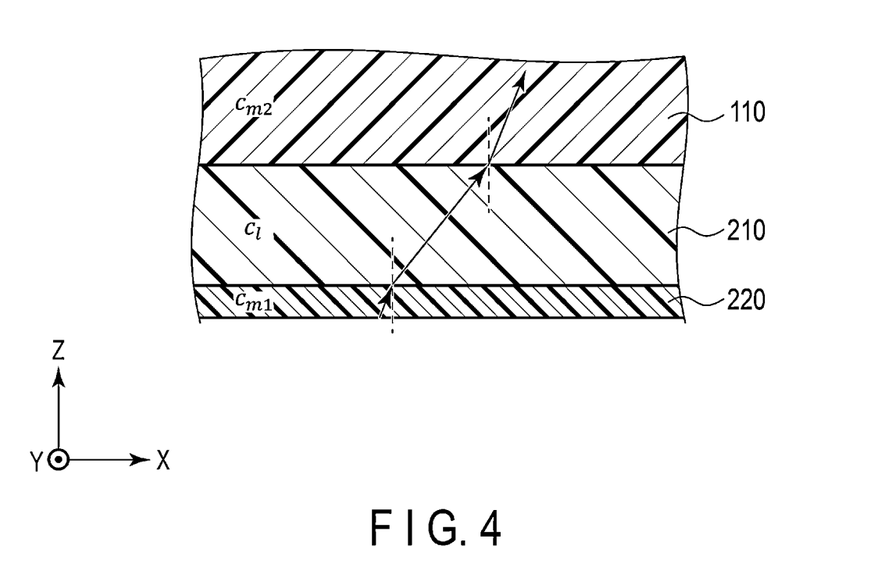
FIG. 4 is an explanatory diagram regarding a sound speed of a distal end cover, an acoustic lens, and an acoustic matching layer in FIG. 2.

FIG. 4 is an explanatory diagram regarding the sound speed of the distal end cover 110, the acoustic lens 210, and the adhesive layer 220 shown in FIG. 2. In a case where the distal end cover 110, the acoustic lens 210, and the adhesive layer 220 have sound speeds $c_{m2}$, $c_1$, and $c_{m1}$, respectively, they are formed of materials that satisfy, for example, relationships of $c_1 > c_{m2}$ and $c_1 > c_{m1}$. With this configuration, the biconcave lens included in the acoustic lens 210 enables the acoustic lens 210 to converge ultrasonic beams in the slice direction.

Specifically, when an ultrasonic beam is incident on the acoustic lens 210 from the adhesive layer 220, in a case where their sound speeds have a relationship of $c_1 > c_{m1}$, the ultrasonic beam is refracted in the direction of convergence by the first curved surface 310. When an ultrasonic beam is incident on the distal end cover 110 from the acoustic lens 210, in a case where their sound speeds have a relationship of $c_1 > c_{m2}$, the ultrasonic beam is refracted in the direction of convergence by the second curved surface 320. Since the sound speed of the distal end cover 110 is approximately the same as the sound speed of the soft tissue (body surface) of a living body, almost no refraction of an ultrasonic beam occurs when the ultrasonic beam is incident on the body surface from the distal end cover 110.

As described above, the acoustic lens 210 can converge ultrasonic beams on both the first curved surface 310 and the second curved surface 320. This enables the acoustic lens 210 to perform convergence twice in order to satisfy a desired focal distance, so that each of the first curved surface 310 and the second curved surface 320 can be made larger in radius of curvature than the first curved surface 310 and the second curved surface 320 in a case of using a plano-concave lens. Meanwhile, the focal distance according to the first embodiment is a distance with a contact surface between the distal end cover 110 configured to cover the acoustic lens 210 and the body surface being used as a reference, and is, for example, 45 mm or less.

As described above, an ultrasonic probe according to the first embodiment includes a transducer group having a plurality of ultrasonic transducers, and an acoustic lens having a first curved surface and a second curved surface each corresponding to acoustically effective aperture $A_{ef}$ of at least the transducer group. A sound speed of the acoustic lens is higher than a sound speed of a first medium in contact with the first curved surface, and higher than a sound speed of a second medium in contact with the second curved surface or a sound speed of a soft tissue in contact with the second curved surface. The first curved surface is a concave surface and faces a transmitting/receiving side. The second curved surface is a concave surface and opposes the first curved surface. The first curved surface is different in radius of curvature from the second curved surface.

Furthermore, the ultrasonic probe according to the first embodiment further includes a distal end cover configured to cover at least the second curved surface of the acoustic lens and formed of the second medium.

Because of the ultrasonic probe according to the first embodiment being equipped with an acoustic lens composed of a biconcave lens, a radius of curvature per lens can be increased. This can prevent a decrease in a radiation efficiency due to an angle of incidence of an ultrasonic beam. The ultrasonic probe according to the first embodiment can improve the radiation efficiency of an ultrasonic beam from the acoustic lens to a living body. This can reduce the influence of artifacts due to multiple reflections of the ultrasonic beam within the acoustic lens. Therefore, the ultrasonic probe according to the first embodiment can improve an image quality of ultrasonic images.

Second Embodiment

The ultrasonic probe according to the first embodiment is configured such that the acoustic lens is covered with the distal end cover. On the other hand, the ultrasonic probe according to the second embodiment is configured such that the acoustic lens serves also as the distal end cover.

Figure 5:
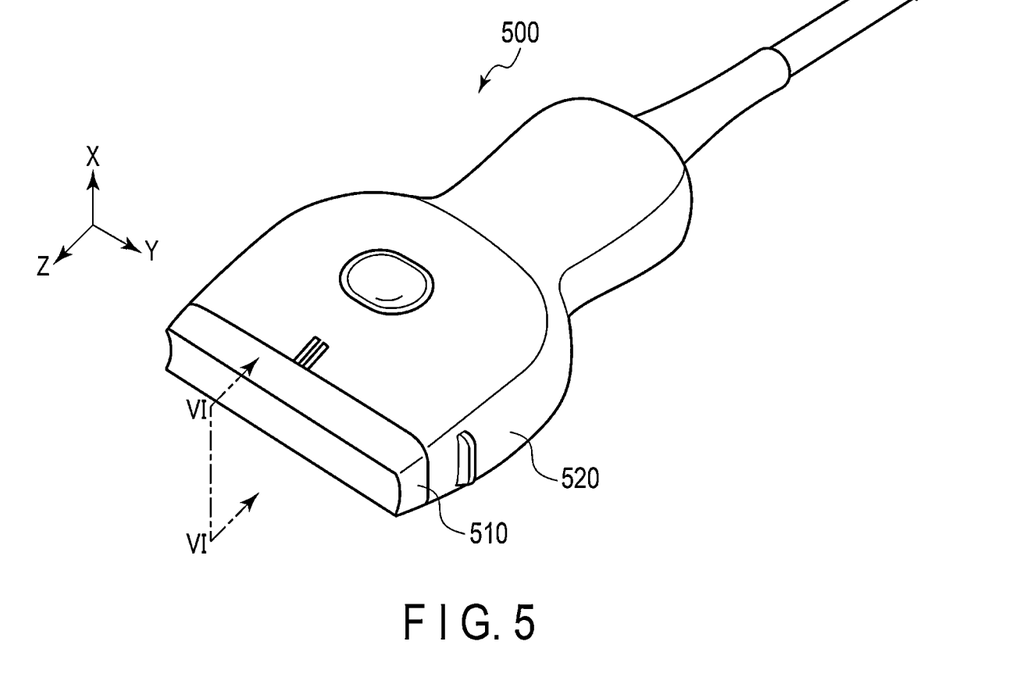
FIG. 5 is a diagram illustrating an example of an external appearance of an ultrasonic probe according to a second embodiment.

FIG. 5 is a diagram illustrating an example of an external appearance of an ultrasonic probe 500 according to a second embodiment. The ultrasonic probe 500 corresponds to, for example, a high-frequency linear probe. The ultrasonic probe 100 performs ultrasound scanning on a scan region within a living body under control of an ultrasonic diagnostic apparatus.

The external appearance of the ultrasonic probe 500 is composed of an acoustic lens 510 serving as a distal end cover and a case 520. The acoustic lens 510 is provided at the distal end of the ultrasonic probe 500. A concrete configuration of the ultrasonic probe 500 will be described with reference to FIG. 6.

Figure 6:
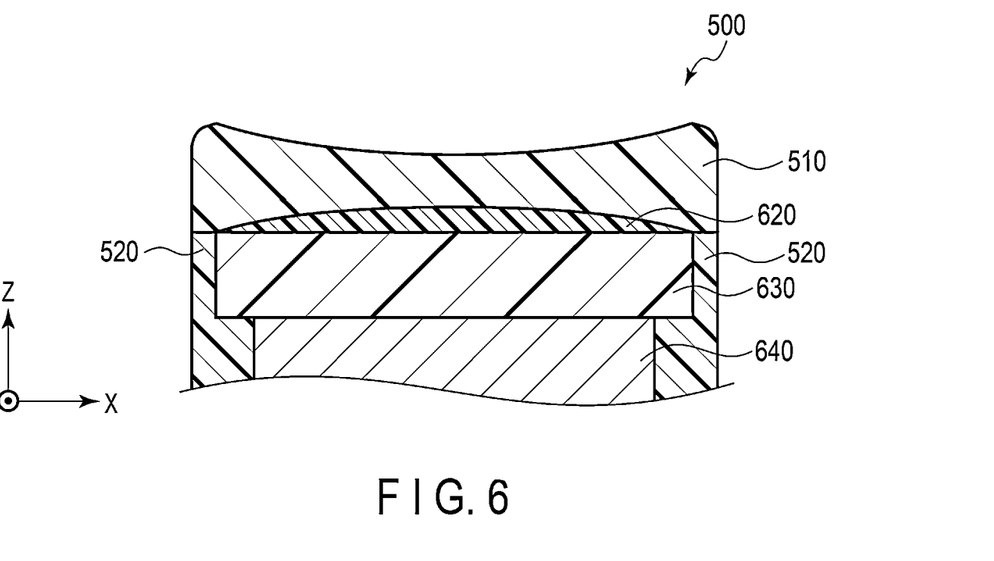
FIG. 6 is a sectional view taken along line VI-VI in FIG. 5.

FIG. 6 is a sectional view taken along line VI-VI in FIG. 5. FIG. 6 shows a portion of the cross section of the ultrasonic probe 500 in the slice direction. As shown in FIG. 6, the ultrasonic probe 500 includes the acoustic lens 510 and the case 520, and further includes an adhesive layer 620, an acoustic matching layer 630, and a transducer group 640. FIG. 6 omits configurations subsequent to a backing material provided in the transducer group 640.

The acoustic lens 510 is formed of, for example, a material containing polymethylpentene as a main component. The acoustic lens 510 has two curved surfaces such that the thickness of the central portion in the slice direction is thinner than the thickness of the peripheral portion. Each of the two curved surfaces is a concave surface. The acoustic lens 510 includes a region forming a biconcave lens. Two curved surfaces are formed on an incident surface and a radiation surface of the acoustic lens 510, respectively. A radiation surface of the acoustic lens 510 constitutes a distal end of the ultrasonic probe 500. The incident surface of the acoustic lens 510 is jointed to the acoustic matching layer 630 with the adhesive layer 620 intervening therebetween. In the example shown in FIG. 6, the acoustic lens 510 is joined to an end portion of the case 520.

A description of the case 520, the adhesive layer 620, the acoustic matching layer 630, and the transducer group 640 will be omitted because their configurations are the same as those of the case 120, the adhesive layer 220, the acoustic matching layer 230, and the transducer group 240

Figure 7:
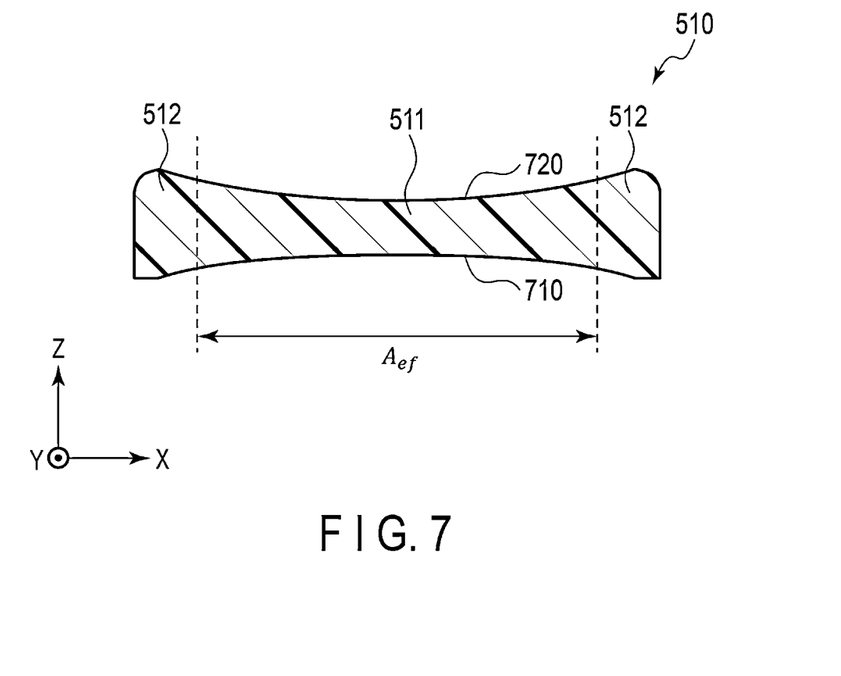
FIG. 7 is an explanatory diagram regarding an acoustic lens in FIG. 6.

FIG. 7 is an explanatory diagram regarding the acoustic lens 510 shown in FIG. 6. The acoustic lens 510 has a first region 511 corresponding to an acoustic effective aperture $A_{ef}$ and a second region 512 other than the first region 511. The first region 511 has a first curved surface 710 formed on the incident surface of the acoustic lens 510 and a second curved surface 720 formed on the radiation surface of the acoustic lens 510. The first curved surface 710 and the second curved surface 720 may be the same in curvature (the same in radius of curvature), or may be different in curvature (may be different in radius of curvature).

In other words, the acoustic lens 510 is provided on the transmitting/receiving side of the transducer group 640 and has the first curved surface 710 and the second curved surface 720 each corresponding to the acoustically effective aperture $A_{ef}$ of at least the transducer group 640. The first curved surface 710 is a concave surface and faces the transmitting/receiving side, and the second curved surface 720 is a concave surface and opposes the first curved surface 710.

A relationship in sound speed between the acoustic lens 510 and the adhesive layer 620 is the same as the relationship in sound speed between the acoustic lens 210 and the adhesive layer 220. That is, in a case where the acoustic lens 510 and the adhesive layer 620 have sound speeds $c_1$ and $c_{m1}$, respectively, they are formed of materials that satisfy, for example, a relationship of $c_1 > c_{m1}$. Furthermore, in a case where a soft tissue of a living body has a sound speed $c_t$, the acoustic lens 510 is formed of a material that satisfies, for example, a relationship of $c_1 > c_t$. With these configurations, the biconcave lens included in the acoustic lens 510 enables the acoustic lens 510 to converge ultrasonic beams in the slice direction.

Specifically, when an ultrasonic beam is incident on the acoustic lens 510 from the adhesive layer 620, in a case where their sound speeds have a relationship of $c_1 > c_{m1}$, the ultrasonic beam is refracted in the direction of convergence by the first curved surface 710. When an ultrasonic beam is incident on a soft tissue of a living body (body surface) from the acoustic lens 510, in a case where their sound speeds have a relationship of $c_1 > c_t$, the ultrasonic beam is refracted in the direction of convergence by the second curved surface 720.

As described above, the acoustic lens 510 can converge ultrasonic beams on both the first curved surface 710 and the second curved surface 720. This enables the acoustic lens 510 to perform convergence twice in order to satisfy a desired focal distance, so that each of the first curved surface 710 and the second curved surface 720 can be made larger in radius of curvature than the first curved surface 710 and the second curved surface 720 in a case of using a plano-concave lens. Meanwhile, the focal distance according to the second embodiment is a distance with a contact surface between the acoustic lens 510 and the body surface being used as a reference, and is, for example, 45 mm or less.

As described above, an ultrasonic probe according to the second embodiment includes a transducer group having a plurality of ultrasonic transducers, and an acoustic lens having a first curved surface and a second curved surface each corresponding to an acoustically effective aperture $A_{ef}$ of at least the transducer group. A sound speed of the acoustic lens is higher than a sound speed of a first medium in contact with the first curved surface, and higher than a sound speed of a second medium in contact with the second curved surface or a sound speed of a soft tissue in contact with the second curved surface. The first curved surface is a concave surface and faces a transmitting/receiving side. The second curved surface is a concave surface and opposes the first curved surface. The first curved surface is different in radius of curvature from the second curved surface.

Thus, effects similar to those of the first embodiment can be obtained by the ultrasonic probe according to the second embodiment.

Third Embodiment

In the first embodiment and the second embodiment, the acoustic lens composed of the biconcave lens was described. On the other hand, in the third embodiment, how to determine a radius of curvature of each of the lenses in the biconcave lens will be described. Furthermore, in the third embodiment, a case in which a concave lens formed on the radiation surface of the acoustic lens is smaller in radius of curvature than a concave lens formed on the incident surface of the acoustic lens will be described.

The third embodiment will be described while focusing on a region (effective lens region) corresponding to an acoustically effective aperture in the acoustic lens. Hereinafter, for the sake of explanation, an acoustic lens including only an effective lens region will be described. The contents of the third embodiment are applicable to both the acoustic lens in the first embodiment and the acoustic lens in the second embodiment.

Figure 8:
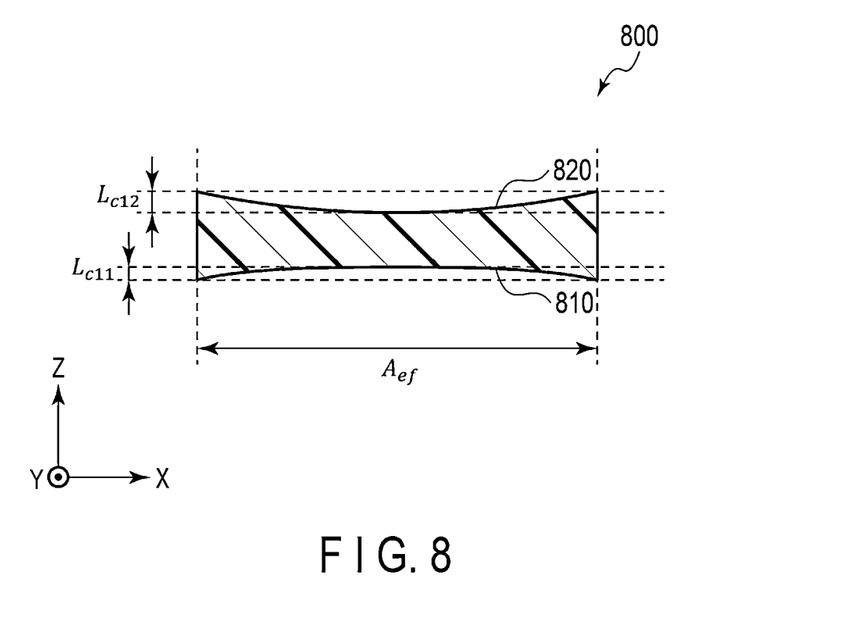
FIG. 8 is an explanatory diagram regarding an acoustic lens according to the third embodiment.

FIG. 8 is an explanatory diagram regarding an acoustic lens 800 according to the third embodiment. The acoustic lens 800 corresponds to an acoustically effective aperture Af. The acoustic lens 800 includes a first curved surface 810 corresponding to the incident surface and a second curved surface 820 corresponding to the radiation surface.

In the example shown in FIG. 8, a camber Lol with respect to the acoustically effective aperture $A_{ef}$ corresponding to a chord length in a case of the first curved surface 810 being an arc, is smaller than a camber $L_{c12}$ with respect to the acoustically effective aperture $A_{ef}$ corresponding to a chord length in a case of the second curved surface 820 being an arc. That is, the first curved surface 810 is smaller in curvature than the second curved surface. In other words, the first curved surface 810 is larger in radius of curvature than the second curved surface.

Figure 9:
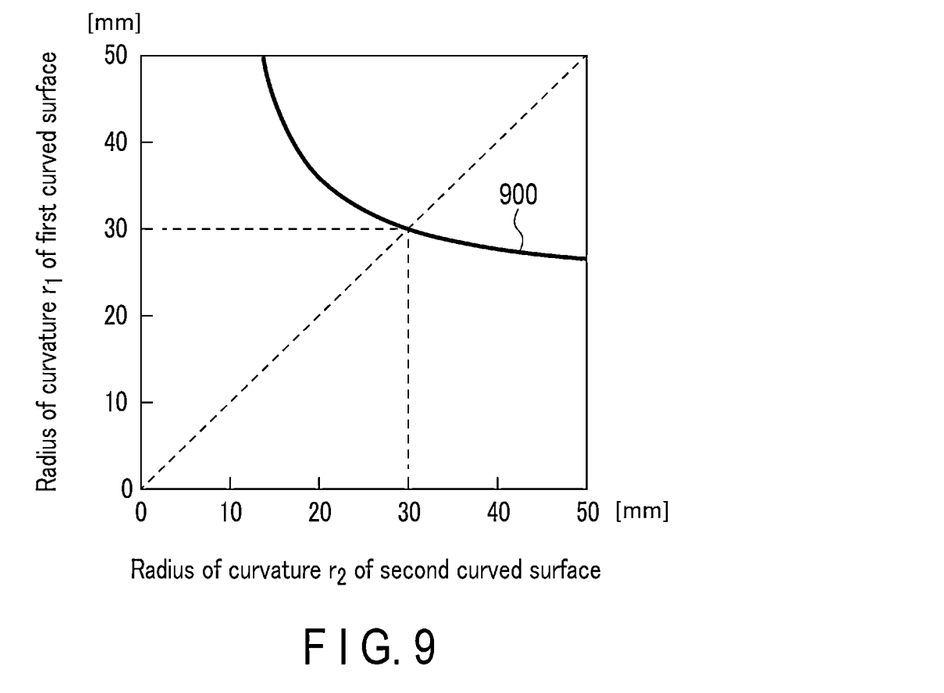
FIG. 9 is a graph illustrating an example of a relationship between a radius of curvature of a first curved surface and a radius of curvature of a second curved surface of the acoustic lens according to the third embodiment.

FIG. 9 is a graph 900 illustrating an example of a relationship between a radius of curvature $r_1$ [mm] of the first curved surface and a radius of curvature $r_2$ [mm] of the second curved surface of the acoustic lens according to the third embodiment. The horizontal axis of the graph 900 represents the radius of curvature $r_2$ of the second curved surface, and the vertical axis of the graph 900 represents the radius of curvature $r_1$ of the first curved surface. The graph 900 represents a combination of the radius of curvature $r_1$ and the radius of curvature $r_2$ in a case where a focal distance is set to be constant (for example, 45 mm). The graph 900 shows that the radius of curvature $r_1$ decreases as the radius of curvature $r_2$ increases. Furthermore, the graph 900 shows that the radius of curvature $r_1$ and the radius of curvature $r_2$ match with each other in a case of the radius of curvature being 30 mm. A relationship between the radius of curvature $r_1$ of the first curved surface and the radius of curvature $r_2$ of the second curved surface is expressed by Formula (1) below.

$$\frac{A_{ef}}{2f} = \frac{A_{ef} c_{m2}}{2r_1}\left(\frac{1}{c_l} - \frac{1}{c_{m1}}\right) + \frac{A_{ef} c_{m2}}{2r_2}\left(\frac{1}{c_{m2}} - \frac{1}{c_l}\right) \quad (1)$$

In Formula (1), $A_{ef}$ represents the acoustically effective aperture, f represents the focal distance, $c_{m1}$ represents the sound speed of a medium (for example, the adhesive layer) in the first curved surface side, $c_{m1}$ represents the sound speed of the acoustic lens, and $c_{m2}$ represents the sound speed of a medium (for example, the distal end cover or the body surface) in the second curved surface side.

The graph 900 is calculated by applying the parameters of f=45 mm, $c_{m1}$=1000 m/sec, $c_l$=2000 m/sec, and $c_{m2}$=1500 m/sec to Formula (1) above. The sound speed of a material which constitutes the acoustic lens and contains polymethylpentene as a main component is 2000 m/sec or more.

Figure 10:
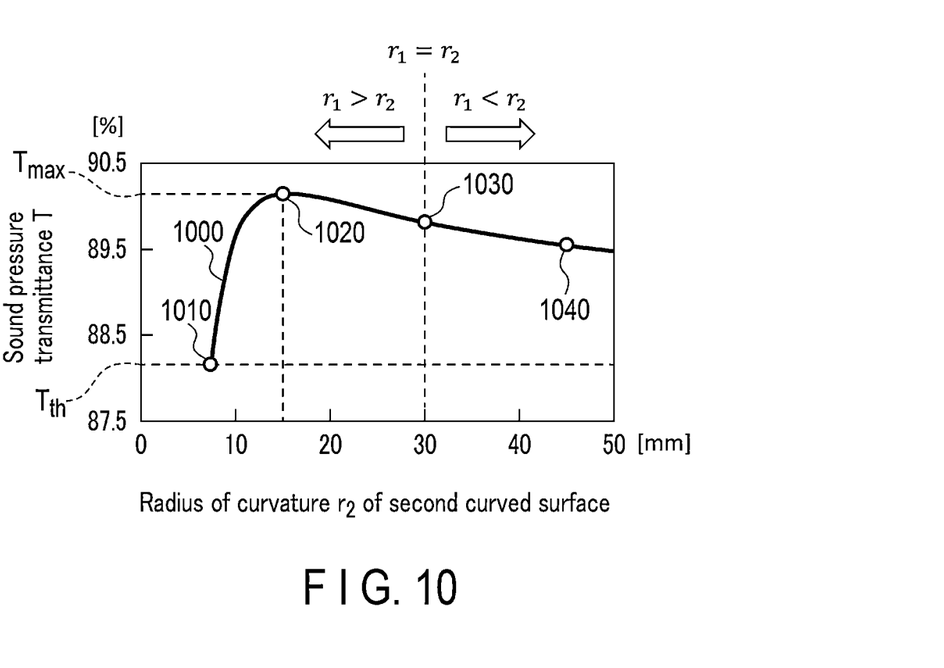
FIG. 10 is a graph illustrating an example of a relationship between a sound pressure transmittance of the acoustic lens and the radius of curvature of the second curved surface according to the third embodiment.

FIG. 10 is a graph 1000 illustrating an example of a relationship between a sound pressure transmittance T[%] of the acoustic lens and the radius of curvature $r_2$ [mm] of the second curved surface according to the third embodiment. The horizontal axis of the graph 1000 represents the radius of curvature $r_2$ of the second curved surface, and the vertical axis of the graph 1000 represents the sound pressure transmittance T. The sound pressure transmittance T represents a ratio of a sound pressure of an ultrasound beam emitted from the acoustic lens to a sound pressure of an ultrasound beam incident on the acoustic lens. In the present embodiment, the sound pressure transmittance T is expressed as a percentage. The graph 1000 shows a change in the sound pressure transmittance T with respect to a change in the radius of curvature $r_2$ of the second curved surface; however, the radius of curvature $r_1$ of the first curved surface also changes depending on the radius of curvature $r_2$ of the second curved surface. Specifically, the radius of curvature $r_1$ of the first curved surface changes according to the radius of curvature $r_2$ of the second curved surface based on the graph 900 in FIG. 9.

Calculation of the sound pressure transmittance T requires calculation of a transmittance at an interface between different acoustic impedances (for example, the interface between the adhesive layer and the acoustic lens, or the interface between the acoustic lens and the distal end cover (or the body surface)). The sound pressure transmittance t of this interface is expressed by, for example, Formula (2) below.

$$t = \frac{2Z_1\cos\theta_t}{Z_2\cos\theta_i + Z_1\cos\theta_t} \quad (2)$$

In Formula (2), Z1 represents an acoustic impedance of a medium on an incident side of an ultrasonic beam, $\theta_1$ represents an incident angle of an ultrasonic beam, $Z_2$ represents an acoustic impedance of a medium on a radiation side of the ultrasonic beam, and $\theta_t$ represents a transmission angle of an ultrasound beam.

The sound pressure transmittance T of the graph 1000 is calculated by using Formula (2), etc., and applying 1.8 MRayl to the acoustic impedance of the adhesive layer, 1.6 MRayl to the acoustic impedance of the acoustic lens, and 1.725 MRayl to the acoustic impedance of the distal end cover. The sound pressure transmittance T in the graph 1000 focuses on a change in radius of curvature, and thus does not consider an absorption coefficient (attenuation rate) of each medium.

Next, a shape of the acoustic lens at each point of the graph 1000 will be described with reference to FIG. 11. The graph 1000 shows a point 1010, a point 1020, a point 1030, and a point 1040 which are different in radius of curvature $r_2$.

Figure 11:
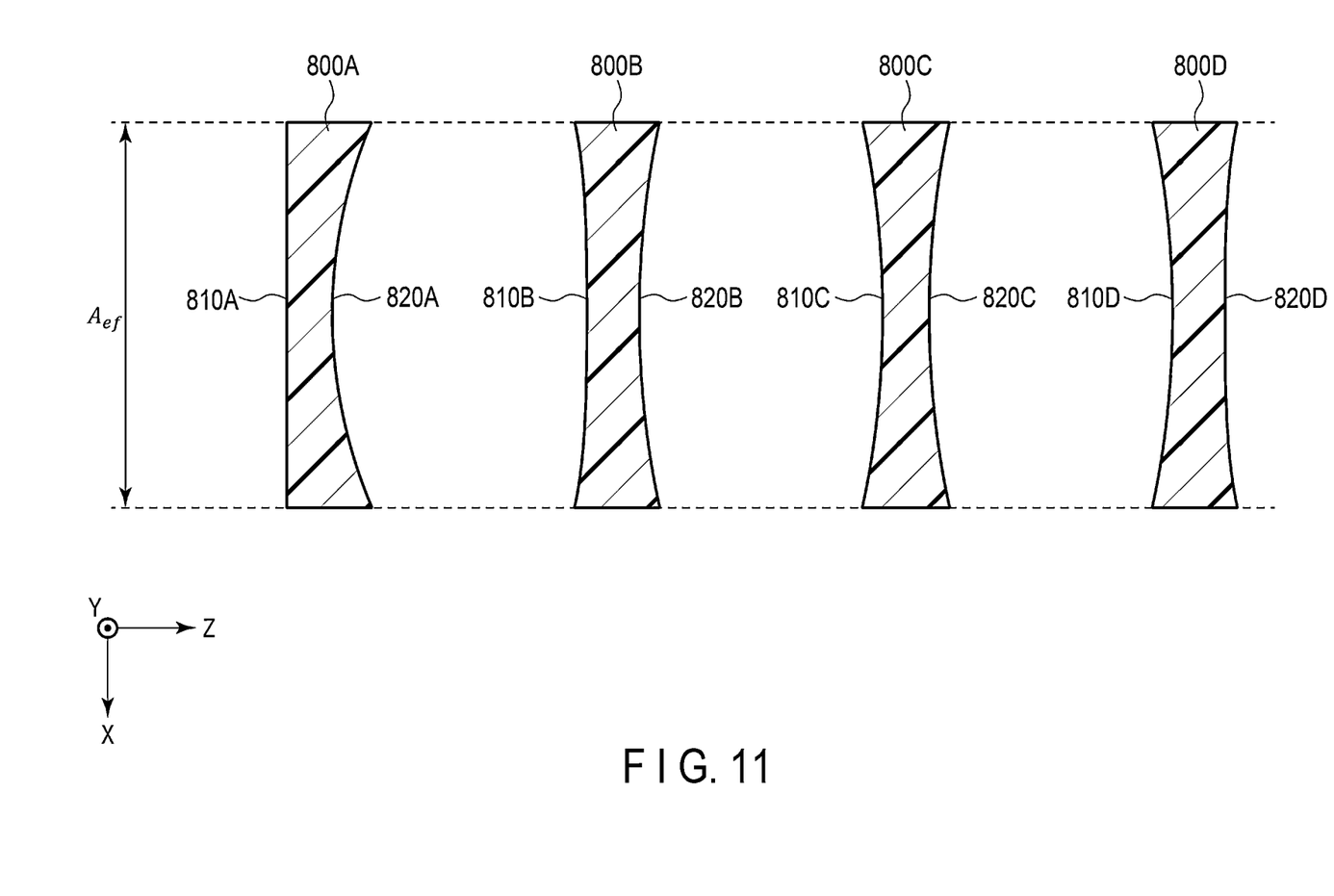
FIG. 11 is an explanatory diagram illustrating an example of a shape of an acoustic lens at each point in the graph of FIG. 10.

FIG. 11 is an explanatory diagram illustrating an example of a shape of an acoustic lens at each point in the graph 1000 of FIG. 10. FIG. 11 shows an acoustic lens 800A, an acoustic lens 800B, an acoustic lens 800C, and an acoustic lens 800D. These acoustic lenses respectively correspond to the aforementioned points.

The acoustic lens 800A includes a first curved surface 810A and a second curved surface 820A. The radius of curvature of the second curved surface 820A corresponds to the point 1010 of the graph 1000. At the point 1010, the radius of curvature $r_2$ is 7.5 mm. That is, the second curved surface 820A has a radius of curvature of 7.5 mm. At this time, according to the graph 900, the first curved surface 810A has an infinite radius of curvature. In a case of an infinite radius of curvature, the curved surface can be deemed to be a flat surface, so that the first curved surface 810A is deemed to be a flat surface. Thus, the acoustic lens 800A can be deemed to be a plano-concave lens. The acoustic lens 800A has a sound pressure transmittance T ($T_{th}$) of 88.2%.

The acoustic lens 800B includes a first curved surface 810B and a second curved surface 820B. The radius of curvature of the second curved surface 820B corresponds to the point 1020 of the graph 1000. At the point 1020, the radius of curvature $r_2$ is 15 mm. That is, the second curved surface 820B has a radius of curvature ($r_2$) of 15 mm. At this time, according to the graph 900, the first curved surface 810B has a radius of curvature ($r_1$) of 45 mm. The acoustic lens 800B has a sound pressure transmittance ($T_{max}$) of 90.2%.

The acoustic lens 800C includes a first curved surface 810C and a second curved surface 820C. The radius of curvature of the second curved surface 820C corresponds to the point 1030 of the graph 1000. At the point 1030, the radius of curvature $r_2$ is 30 mm. That is, the second curved surface 820C has a radius of curvature ($r_2$) of 30 mm. At this time, according to the graph 900, the first curved surface 810C has a radius of curvature ($r_1$) of 30 mm. The acoustic lens 800C has a sound pressure transmittance T of 89.8%.

The acoustic lens 800D includes a first curved surface 810D and a second curved surface 820D. The radius of curvature of the second curved surface 820D corresponds to the point 1040 of the graph 1000. At the point 1040, the radius of curvature $r_2$ is 45 mm. That is, the second curved surface 820D has a radius of curvature ($r_2$) of 45 mm. At this time, according to the graph 900, the first curved surface 810D has a radius of curvature ($r_1$) of 27 mm. The acoustic lens 800D has a sound pressure transmittance T of 89.5%.

Accordingly, it is understood that the acoustic lens according to the third embodiment exhibits, in a case of a focal distance being constant, a sound pressure transmittance that is higher than the plano-concave lens, no matter what combination of the radii of curvature of two curved surfaces that form the biconcave lens. Furthermore, the acoustic lens according to the third embodiment exhibits a combination of the radii of curvature of two curved surfaces, which involves the maximum sound pressure transmittance, in a range in which the radius of curvature of the first curved surface is larger than the radius of curvature of the second curved surface (that is, a range of $r_1 > r_2$).

As described above, the ultrasonic probe according to the third embodiment has a similar configuration to that of the ultrasonic probe according to the first embodiment or the ultrasonic probe according to the second embodiment. In the acoustic lens included in the ultrasonic probe according to the third embodiment, the first curved surface and the second curved surface may be the same or different in radius of curvature.

Furthermore, in the acoustic lens included in the ultrasonic probe according to the third embodiment, the first curved surface may be larger in radius of curvature than the second curved surface. Yet further, the acoustic lens included in the ultrasonic probe according to the third embodiment may be smaller in acoustic impedance than the first medium in contact with the first curved surface and smaller in acoustic impedance than the second medium in contact with the second curved surface, and the first medium may be larger in acoustic impedance than the second medium.

Therefore, the ultrasonic probe according to the third embodiment can obtain similar effects to those of the first embodiment and the second embodiment.

Fourth Embodiment

In the third embodiment, a case in which a concave lens formed on the radiation surface of the acoustic lens is smaller in radius of curvature than a concave lens formed on the incident surface of the acoustic lens were described. On the other hand, in the fourth embodiment, a case in which a concave lens formed on the radiation surface of the acoustic lens is larger in radius of curvature than a concave lens formed on the incident surface of the acoustic lens will be described.

As with the third embodiment, the fourth embodiment will be described while focusing on an effective lens region in the acoustic lens. Hereinafter, for the sake of explanation, an acoustic lens including only an effective lens region will be described. The contents of the fourth embodiment are applicable to both the acoustic lens in the first embodiment and the acoustic lens in the second embodiment.

Figure 12:
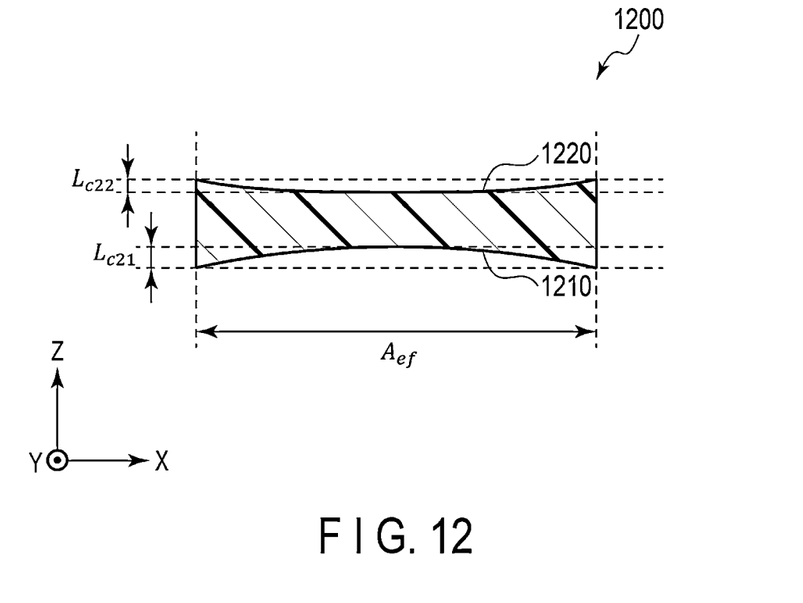
FIG. 12 is an explanatory diagram regarding an acoustic lens according to a fourth embodiment.

FIG. 12 is an explanatory diagram regarding an acoustic lens 1200 according to the fourth embodiment. The acoustic lens 1200 corresponds to an acoustically effective aperture $A_{ef}$. The acoustic lens 1200 includes a first curved surface 1210 corresponding to the incident surface and a second curved surface 1220 corresponding to the radiation surface. In the example shown in FIG. 12, a camber $L_{c21}$ with respect to the acoustically effective aperture $A_{ef}$ corresponding to a chord length in a case of the first curved surface 1210 being an arc, is larger than a camber $L_{c22}$ with respect to the acoustically effective aperture $A_{ef}$ corresponding to a chord length in a case of the second curved surface 1220 being an arc. That is, the first curved surface 1210 is larger in curvature than the second curved surface. In other words, the first curved surface 1210 is smaller in radius of curvature than the second curved surface 1220.

Figure 13:
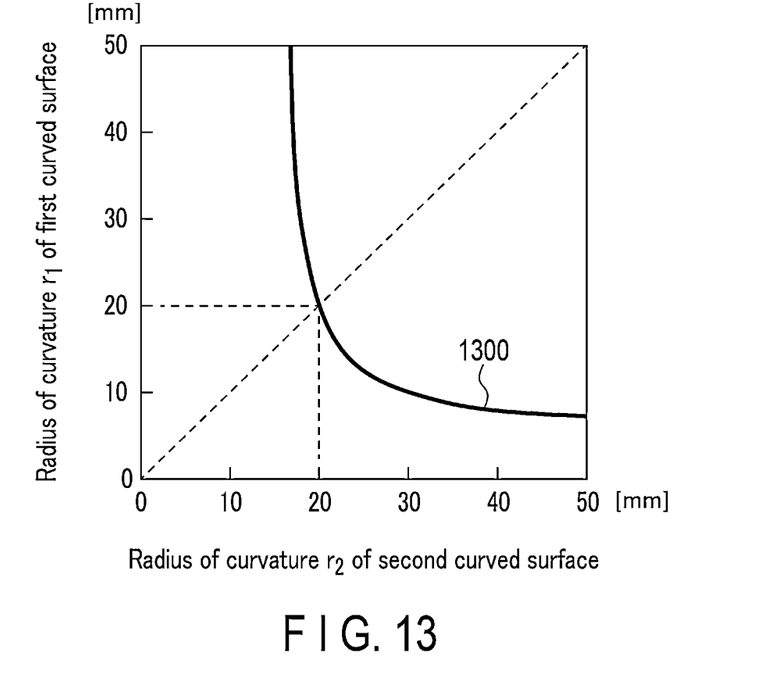
FIG. 13 is a graph illustrating an example of a relationship between a radius of curvature of the first curved surface and a radius of curvature of the second curved surface of the acoustic lens according to the fourth embodiment.

FIG. 13 is a graph 1300 illustrating an example of a relationship between a radius of curvature $r_1$ [mm] of the first curved surface and a radius of curvature $r_2$ [mm] of the second curved surface of the acoustic lens according to the fourth embodiment. The horizontal axis of the graph 1300 represents the radius of curvature $r_2$ of the second curved surface, and the vertical axis of the graph 1300 represents the radius of curvature $r_1$ of the first curved surface. The graph 1300 represents a combination of the radius of curvature $r_1$ and the radius of curvature $r_2$ in a case where a focal distance is set to be constant (for example, 45 mm). The graph 1300 shows that the radius of curvature $r_1$ decreases as the radius of curvature $r_2$ increases. Furthermore, the graph 1300 shows that the radius of curvature $r_1$ and the radius of curvature $r_2$ match each other in a case of the radius of curvature being 20 mm. A relationship between the radius of curvature $r_1$ of the first curved surface and the radius of curvature $r_2$ of the second curved surface is expressed by Formula (1) described above.

The graph 1300 is calculated by applying the parameters of f=30 mm, $c_{m1}$=1500 m/sec, $c_1$=2000 m/sec, and $c_{m2}$=1000 m/sec to Formula (1) described above. The sound speed of a material, which constitutes the acoustic lens and contains polymethylpentene as a main component, is 2000 m/sec or more.

Figure 14:
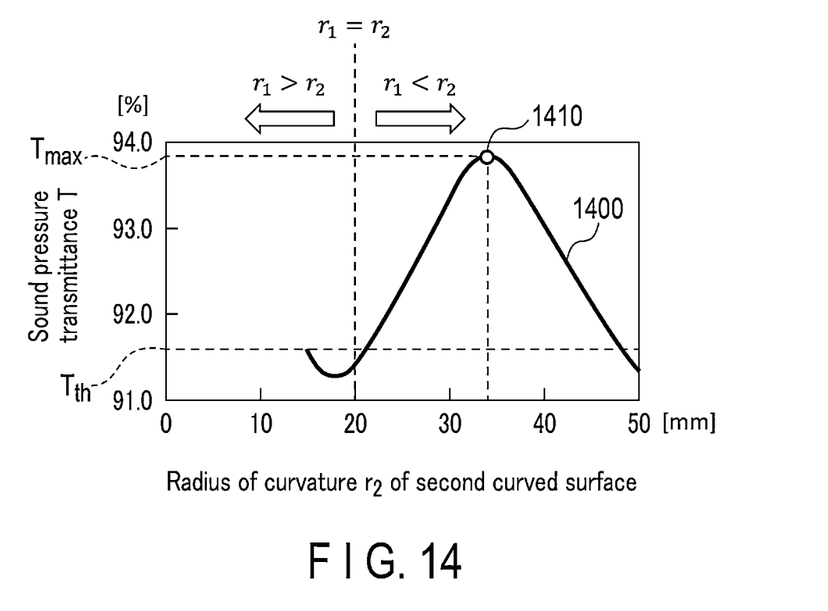
FIG. 14 is a graph illustrating an example of a relationship between a sound pressure transmittance of the acoustic lens and the radius of curvature of the second curved surface according to the fourth embodiment.

FIG. 14 is a graph 1400 illustrating an example of a relationship between a sound pressure transmittance T[%] of the acoustic lens and the radius of curvature $r_2$ [mm] of the second curved surface according to the fourth embodiment. The horizontal axis of the graph 1400 represents the radius of curvature $r_2$ of the second curved surface, and the vertical axis of the graph 1400 represents the sound pressure transmittance T. The graph 1400 shows a change in the sound pressure transmittance T with respect to a change in the radius of curvature $r_2$ of the second curved surface; however, the radius of curvature $r_1$ of the first curved surface also changes depending on the radius of curvature $r_2$ of the second curved surface. Specifically, the radius of curvature $r_1$ of the first curved surface changes according to the radius of curvature $r_2$ of the second curved surface based on the graph 1300 in FIG. 13.

Calculation of the sound pressure transmittance T is the same as the third embodiment. The sound pressure transmittance T of a graph 1400 is calculated using Formula (2) described above, etc., and applying 1.725 Mrayl to the acoustic impedance of the adhesive layer, 1.6 MRayl to the acoustic impedance of the acoustic lens, and 1.6 MRayl to the acoustic impedance of the distal end cover. The sound pressure transmittance T in the graph 1400 focuses on a change in radius of curvature, and thus does not consider an absorption coefficient (attenuation rate) of each medium.

Next, a point 1410 at which the sound pressure transmittance T is maximized in the graph 1400 will be described with reference to the acoustic lens 1200.

The radius of curvature of the second curved surface 1220 in the acoustic lens 1200 corresponds to the point 1410 of the graph 1400. At the point 1410, the radius of curvature $r_2$ is 34 mm. That is, the second curved surface 1220 has a radius of curvature ($r_2$) of 34 mm. At this time, according to the graph 1300, the first curved surface 1210 has a radius of curvature ($r_1$) of 9 mm. The acoustic lens 1200 has a sound pressure transmittance T of 93.8%.

As described above, the acoustic lens 1200 according to the third embodiment exhibits a combination of the radii of curvature of two curved surfaces, which involves the maximum sound pressure transmittance, in a range in which the radius of curvature of the first curved surface is smaller than the radius of curvature of the second curved surface (that is, a range of $r_1 > r_2$).

As described above, the ultrasonic probe according to the fourth embodiment has a similar configuration to that of the ultrasonic probe according to the first embodiment or the ultrasonic probe according to the second embodiment.

Furthermore, in the acoustic lens included in the ultrasonic probe according to the fourth embodiment, the first curved surface may be smaller in radius of curvature than the second curved surface. Yet further, the acoustic lens included in the ultrasound probe according to the fourth embodiment may be smaller in acoustic impedance than the first medium in contact with the first curved surface and smaller in acoustic impedance than the second medium in contact with the second curved surface, and the first medium may be smaller in acoustic impedance than the second medium.

Therefore, the ultrasonic probe according to the fourth embodiment can obtain similar effects to those of the first embodiment and the second embodiment.

According to at least one of the above embodiments, an image quality of ultrasonic images can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic probe comprising:
    a transducer group including a plurality of ultrasonic transducers; and
    an acoustic lens provided on a transmitting/receiving side of the transducer group and including a first curved surface and a second curved surface corresponding to an acoustically effective aperture of at least the transducer group, wherein
    the acoustic lens is:
        higher in sound speed than a first medium in contact with the first curved surface; and
        higher in sound speed than a second medium in contact with the second curved surface or a soft tissue in contact with the second curved surface,
    the first curved surface is a concave surface and facing the transmitting/receiving side,
    the second curved surface is a concave surface and opposing the first curved surface, and
    the first curved surface is different in radius of curvature from the second curved surface.

2. The ultrasonic probe according to claim 1, wherein the first curved surface is larger in radius of curvature than the second curved surface.

3. The ultrasonic probe according to claim 2, wherein the acoustic lens is:

smaller in acoustic impedance than the first medium; and smaller in acoustic impedance than the second medium, and the first medium is larger in acoustic impedance than the second medium.

4. The ultrasonic probe according to claim 1, wherein the first curved surface is smaller in radius of curvature than the second curved surface.

5. The ultrasonic probe according to claim 4, wherein the acoustic lens is:

smaller in acoustic impedance than the first medium; and smaller in acoustic impedance than the second medium, and the first medium is smaller in acoustic impedance than the second medium.

6. The ultrasonic probe according to claim 1, wherein the acoustic lens is configured to converge ultrasonic beams generated by the transducer group, in a slice direction.

7. The ultrasonic probe according to claim 6, wherein a focal distance of the ultrasonic beams converged by the acoustic lens is a distance with a contact surface between the acoustic lens and a body surface being used as a reference.

8. The ultrasonic probe according to claim 7, wherein the focal distance is 45 mm or less.

9. The ultrasonic probe according to claim 6, further comprising a cover configured to cover at least the second curved surface of the acoustic lens and formed of a second medium in contact with the second curved surface.

10. The ultrasonic probe according to claim 9, wherein a focal distance of the ultrasonic beams converged by the acoustic lens is a distance with a contact surface between the cover and a body surface being used as a reference.

11. The ultrasonic probe according to claim 10, wherein the focal distance is 45 mm or less.

12. The ultrasonic probe according to claim 9, wherein the acoustic lens is formed of a material with a sound speed of 2000 m/sec or more.

13. The ultrasonic probe according to claim 12, wherein the acoustic lens is formed of a material containing polymethylpentene as a main component.

14. The ultrasonic probe according to claim 1, wherein the acoustic lens is formed of a material with a sound speed of 2000 m/sec or more.

15. The ultrasonic probe according to claim 14, wherein the acoustic lens is formed of a material containing polymethylpentene as a main component.

\* \* \* \* \*